United States Patent [19]
Johnson

[11] Patent Number: 4,613,190
[45] Date of Patent: Sep. 23, 1986

[54] MODULATOR PRESET CIRCUIT

[75] Inventor: Stuart E. Johnson, Montrose, Calif.

[73] Assignee: Crane Co., Chicago, Ill.

[21] Appl. No.: 598,839

[22] Filed: Apr. 10, 1984

[51] Int. Cl.⁴ .............................................. B60T 8/68
[52] U.S. Cl. .................................... 303/109; 244/111
[58] Field of Search .................... 303/93, 96, 92, 97, 303/104, 105, 106, 107, 109, 108, 110, 111, 100; 364/426; 244/111; 188/181 A, 181 C

[56] References Cited

U.S. PATENT DOCUMENTS

| | | | |
|---|---|---|---|
| 2,799,462 | 7/1957 | Steigerwald | 244/111 |
| 3,131,975 | 5/1964 | Smith et al. | 303/104 |
| 3,582,151 | 6/1971 | Ruof | 303/91 |
| 3,768,873 | 10/1973 | Hirzel | 303/109 |
| 4,130,322 | 12/1978 | Cook | 303/93 |
| 4,180,223 | 12/1979 | Amberg | 244/111 |
| 4,327,414 | 4/1982 | Klein | 188/181 C |
| 4,338,667 | 7/1982 | Cook et al. | 364/426 |
| 4,430,715 | 2/1984 | Gentet et al. | 303/92 |

Primary Examiner—Bruce H. Stoner, Jr.
Assistant Examiner—Alvin Oberley
Attorney, Agent, or Firm—Willian Brinks Olds Hofer Gilson & Lione Ltd.

[57] ABSTRACT

A modulator preset circuit for an aircraft antiskid system is disclosed which operates to preset the modulator to a value proportional to aircraft velocity in order to reduce maximum available braking pressure to a greater degree for higher velocities than for lower velocities of the aircraft. This modulator preset circuit is enabled automatically at the start of a landing in order to ensure that the modulator is properly preset prior to the initiation of any braking activity. In alternate forms, the preset circuit can be enabled at all times. By presetting the modulator in this way initial skid activity immediately after aircraft touchdown is markedly reduced, thereby increasing braking efficiency and reducing tire wear.

18 Claims, 11 Drawing Figures

FIG. 5a — BRAKE TORQUE (TYPICAL)

FIG. 5b — TIRE VERTICAL LOAD (TYPICAL) / LIFT (TYPICAL)

FIG. 5c — EFFECTIVE GROUND FRICTION (TYPICAL)

FIG. 5d — ANTI-SKID VALVE CURRENT / PBM RESET

FIG. 5e — PILOT METERED SUPPLY PRESSURE / BRAKE PRESSURE WITHOUT ANTI-SKID CONTROL / PBM PRESET / OPTIMUM BRAKE PRESSURE (TYPICAL)

MODULATOR PRESET CIRCUIT

BACKGROUND OF THE INVENTION

This invention relates to a preset circuit for use with a modulator in an antiskid system, such as an aircraft antiskid system, for example. The general object of this invention is to improve antiskid performance, particularly at the initiation of braking activity.

Brake pressure control on modern, fully modulating antiskid systems is achieved by a combination of a modulator or PBM and a transient control. The modulator attempts to represent the average brake pressure necessary for optimum brake control and is therefore a time integral function of a signal indicative of a braking condition and exhibits relatively slow modulation characteristics. The transient control is a fast pressure control system that corrects instantaneous brake pressure to avoid over modulation of the modulator.

Prior to initial brake application, the modulator has no information regarding runway conditions, and it therefore allows full metered pressure to be applied to the brake. The resulting deep initial skids are used to adjust the modulator to the required average level. Frequently, as many as five deep skids are produced while the modulator is learning and adjusting to the required average brake pressure level. These initial deep skids reduce braking efficiency.

It has been recognized for some time that various types of antiskid systems which utilize modulators may benefit from initialization of the modulator after initial skid activity. Ruof U.S. Pat. No. 3,582,151 discloses one early such system for use with an antiskid system that provides for modulated reapplication of brake pressure. Amberg U.S. Pat. No. 4,180,223 discloses a second example of an antiskid system which provides an initial skid circuit to modify a brake control signal to reduce the tendency of the system to induce initial skids upon initial application of brake pressure. Cook U.S. Pat. No. 4,338,667, which is assigned to the assignee of the present invention, discloses a digital system which initializes the modulator or PBM after initial braking activity.

The Cook system described above functions particularly effectively in a digital system. This is in part due to the fact that the modulator of a digital antiskid system can rapidly be initialized when desired, after initial braking activity. However, in an analog antiskid system the initialization of a modulator typically takes an appreciable period of time. Thus, braking efficiency can be lost in an analog anti-skid system if the modulator is not initialized until after skid activity has begun. Both the Amberg and Ruof systems referenced above suffer from the same disadvantage in that they do not begin to initialize the modulator until after skid activity has commenced.

SUMMARY OF THE INVENTION

The present invention is directed to an improved modulator preset system that presets an antiskid modulator in such a way as to minimize undesirable initial skid activity at the start of a braking period.

According to a first feature of this invention, a modulator presetting means is provided which is enabled at the start of a braking period, regardless of skid activity of the braked wheel. In this way, the modulator can be preset before skid activity begins, and time delays encountered in the presetting of the modulator do not adversely affect the operation of the antiskid system. In the embodiments disclosed below, the presetting means is enabled for velocities of a vehicle above a threshold velocity.

According to a second feature of this invention, a presetting means for the modulator of a vehicle antiskid system insures that the brake control signal generated by the modulator means corresponds at least to a selected limitation of braking action, which limitation varies as a function of a velocity signal such that the degree of limitation of braking action increases with higher velocities of the vehicle, for at least some velocities. By varying the preset value for the modulator in accordance with the velocity of the vehicle, an improved, more effective presetting of the modulator is provided which allows better use of available braking potential without excessive initial skid activity.

The present invention is particularly well adapted for use with analog antiskid systems, and it provides important advantages in terms of reduced initial skid activity required to initialize the modulator.

The modulator preset circuits described below operate to set the modulator to a level consistent with the pressure required for a dry runway condition, and thereby effectively to eliminate all but minor initial skid activity. The preset circuits disclosed below in addition provide improved performance on wet pavement over conventional antiskid systems which do not include modulator preset circuits. Furthermore, by reducing initial skid activity, heating of the tire and wear on the tire at the beginning of the landing operation are both reduced.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
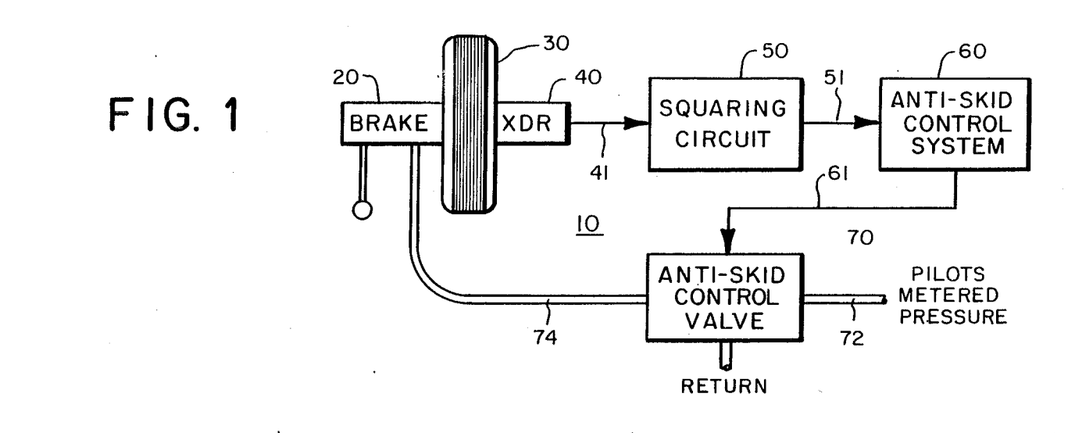
FIG. 1 is a block diagram of an aircraft brake control system which includes a first preferred embodiment of this invention.
Figure 2:
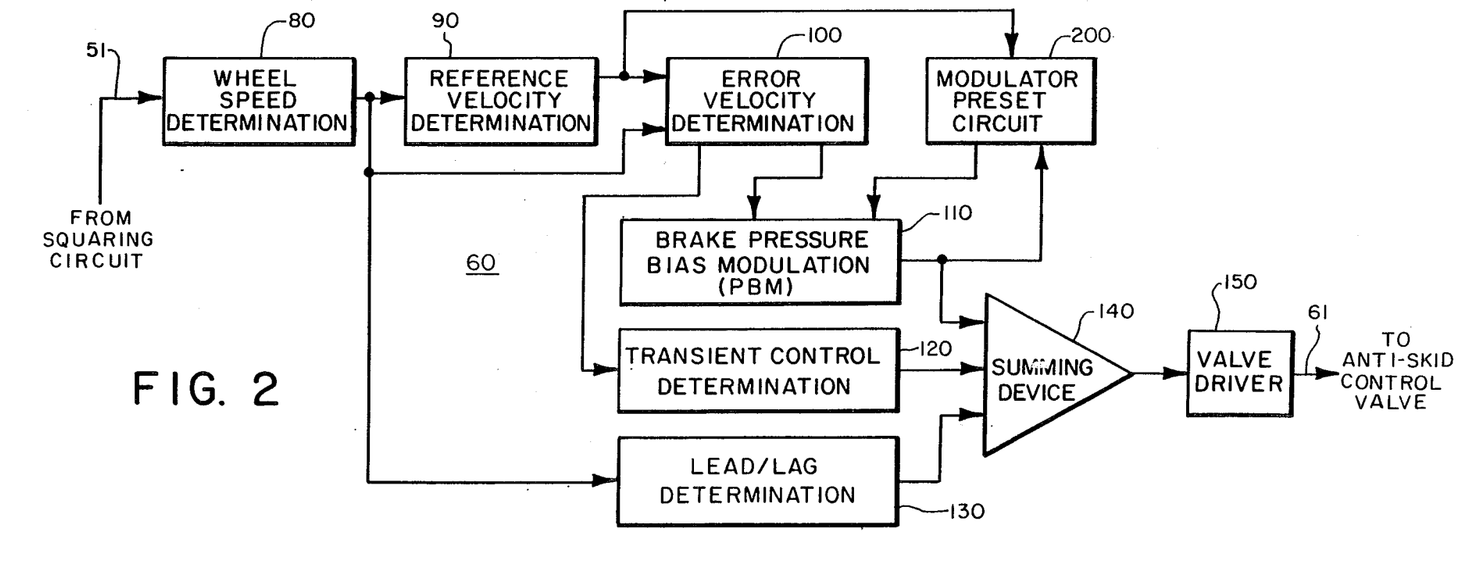
FIG. 2 is a more detailed block diagram of the antiskid control system of FIG. 1.
Figure 3:
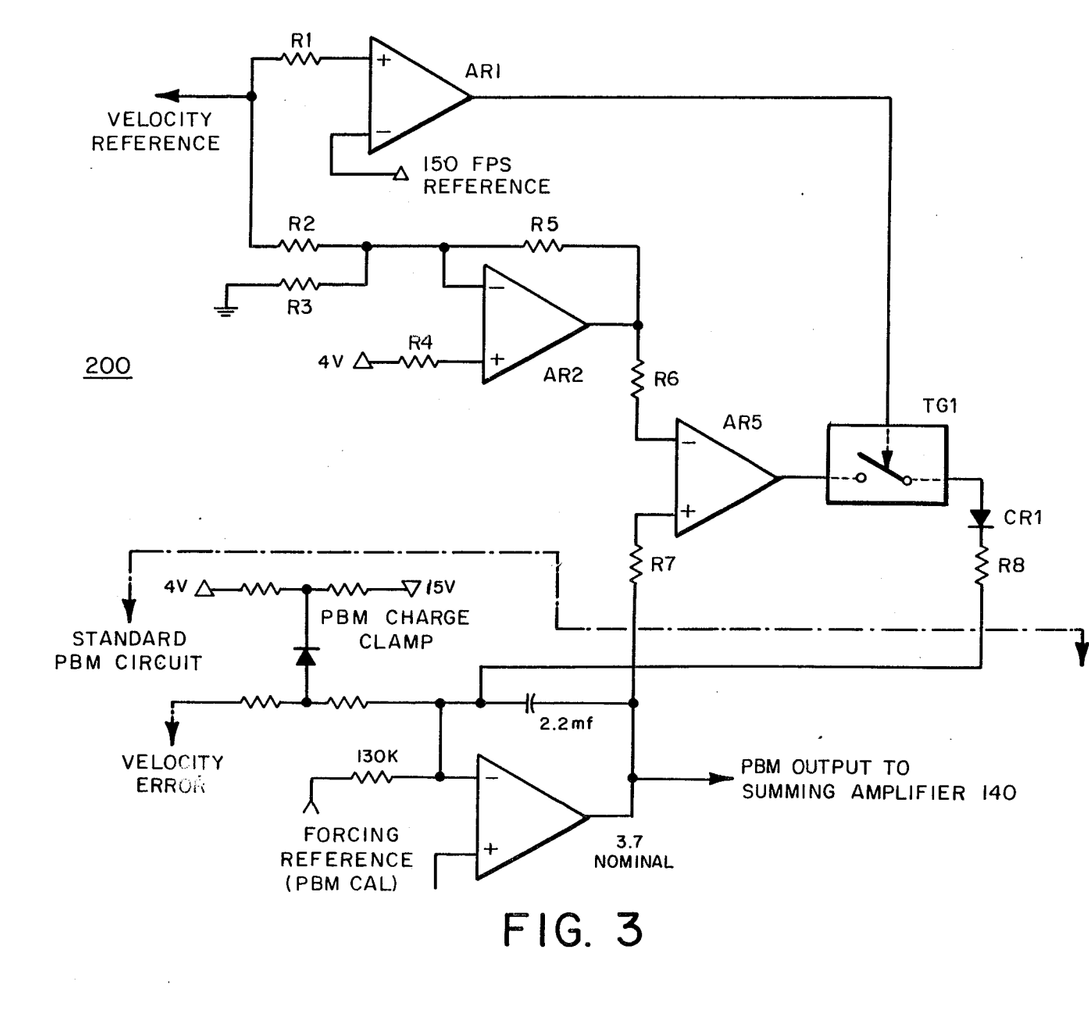
FIG. 3 is a schematic diagram of the modulator preset circuit of FIG. 2.
Figure 4:
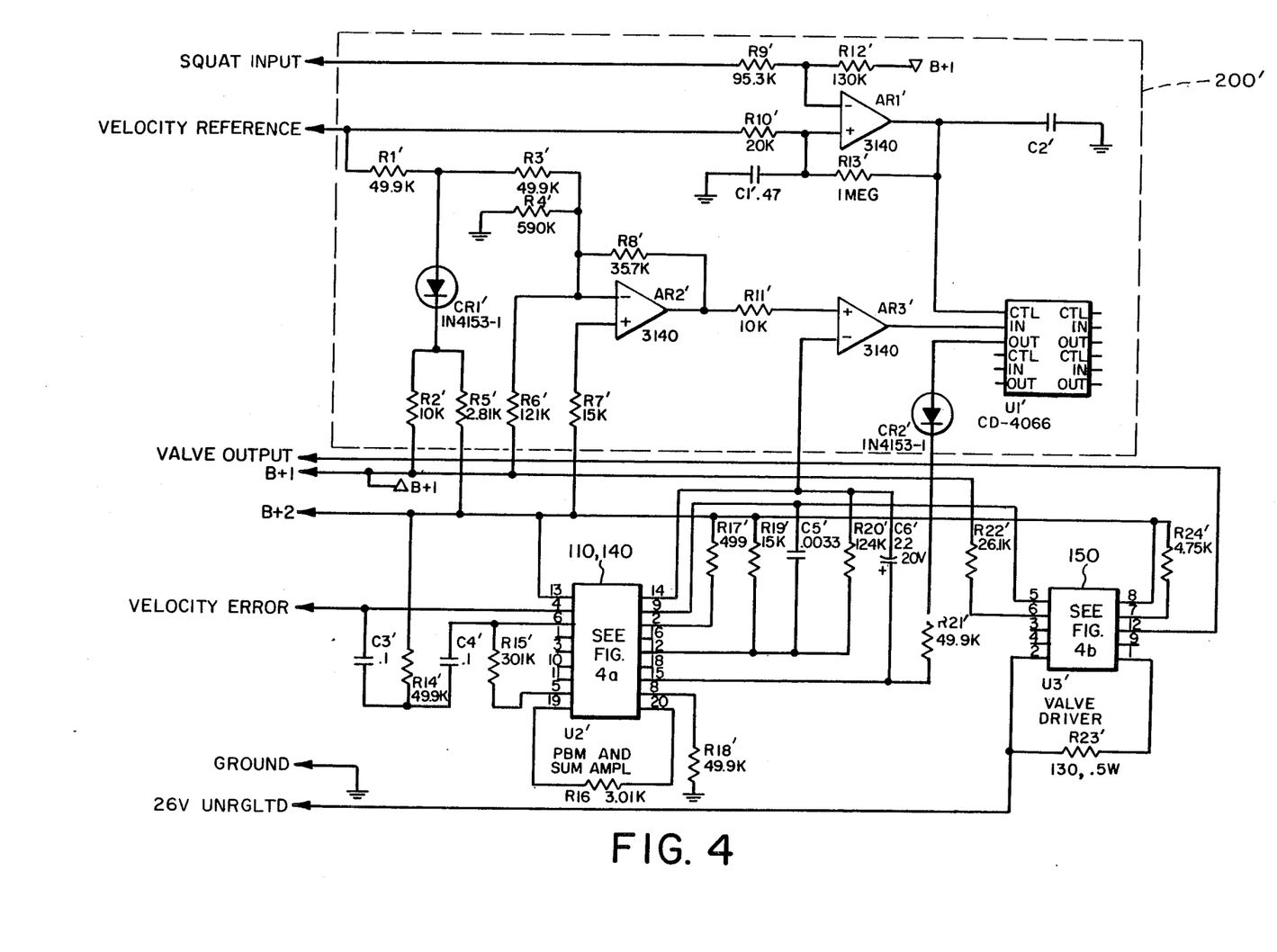
FIG. 4 is a schematic diagram of an alternate embodiment of the modulator preset circuit of FIG. 2.

Turning now to the drawings, FIGS. 1 and 2 are provided to show the environment of the presently preferred embodiment of this invention, and FIGS. 3 and 4 illustrate the two presently preferred embodiments of the invention.

As shown in FIG. 1, the present invention is adapted for use with a brake control system 10 such as an aircraft antiskid system which controls the braking action applied by a brake 20 to a rotating wheel 30. A transducer 40 measures the velocity of rotation of the wheel 30 and generates a transducer signal on line 41. This transducer signal is applied to squaring circuit 50 which generates a square wave signal having a frequency proportional to rotational velocity of the wheel 30 on line 51. This square wave signal is applied to an antiskid control system 60 which generates a brake control signal on line 61. The brake control signal on line 61 is applied to an antiskid control valve 70, which modulates the pressure in hydraulic conduit 74 to a value no greater than the pressure commanded by the pilot of the aircraft via hydraulic conduit 72. The pressurized hydraulic fluid in conduit 74 is supplied to the brake 20 to control the braking action applied to the rotatable wheel 30.

FIG. 2 shows additional details of the anti-skid control system 60. As shown in FIG. 2, the system 60 includes a wheel speed determination circuit 80 which generates an analog signal having a voltage proportional to the rotational velocity of the wheel 30. This wheel velocity signal is applied to a reference velocity determination circuit 90 that generates a signal indicative of the velocity of the vehicle. The error velocity determination circuit 100 determines the error velocity, which is proportional to the difference between the wheel velocity and the reference velocity and is thus an indication of braking activity. This error velocity is supplied both to a modulator 110 and to a transient control determination circuit 120, both of which generate respective brake control signals which are applied to a summing amplifier 140. In addition, a lead/lag determination circuit 130 responds to the wheel velocity signal and generates a third input to the summing amplifier 140. The amplifier 140 sums the three inputs and generates a composite brake control signal which is amplified by a valve driver 150 and supplied via the line 61 to the antiskid control valve 70.

With the exception of the modulator preset circuit 200 of FIG. 2, all of the elements of FIGS. 1 and 2 are conventional prior art devices, well known to those skilled in the art. Hirzel U.S. Pat. No. 3,768,873, assigned to the assignee of the present invention, discloses in detail one complete antiskid system which operates in the manner described above in conjunction with FIGS. 1 and 2.

The present invention is directed to the modulator preset circuit 200, and the remaining portions of the antiskid control system 60 have been described merely by way of illustrating the environment of the invention. For this reason, no additional discussion will be provided of the system 60. Preferably, the antiskid control valve 70 is a single gain valve of the type described in Cook U.S. Pat. No. 4,130,322, assigned to the assignee of the present invention.

FIRST PREFERRED EMBODIMENT

FIG. 3 shows a first preferred embodiment of the modulator preset circuit 200. The portion of FIG. 3 below the dotted line is part of the standard prior art modulator circuit 110, and it forms no part of the present invention.

The modulator preset circuit 200 includes a first amplifier AR1 which is employed as a reference velocity detector circuit. The noninverting input of the amplifier AR1 receives the reference velocity generated by the reference velocity determination circuit 90 and indicative of the actual velocity of the aircraft. The inverting input of the amplifier AR1 receives a constant threshold signal equivalent to a threshold velocity of 150 feet per second. The output signal generated by the amplifier AR1 is in the logic low state whenever the reference velocity is less than 150 feet per second and in the logic high state when the reference velocity is greater than 150 feet per second. This output signal is applied to control a transmission gate TG1 in order to close the transmission gate TG1 whenever the reference velocity is greater than 150 feet per second.

The embodiment of FIG. 3 also includes a second amplifier AR2 which is used as a scaling amplifier to condition the reference velocity signal in order to generate a preset signal which is a linear function of aircraft velocity. Resistor R3 is used in conjunction with resistors R2 and R5 to set the output of the amplifier AR2 approximately equal to 3.7 volts (the normal quiescent modulator level) when the reference velocity equals approximately 150 feet per second. The output of the amplifier AR2 is scaled to produce a negative, decreasing signal of approximately 0.1 volts per ten feet per second increase in reference velocity above 150 feet per second. This results in a change in the output signal of the valve driver 150 of approximately 1 mA of current to the valve 70 per ten feet per second above 150 per second. Thus, when the reference velocity is equal to 250 feet per second, the preset circuit 200 contributes 10 milliamps above the normal quiescent level, thereby limiting the brake pressure in the conduit 74 to approximately 2,250 psi. Of course, the circuit of FIG. 3 is tunable for any desired preset level appropriate for any particular vehicle.

The embodiment of FIG. 3 includes a third amplifier AR3 which also defines inverting and non-inverting inputs. The output of the amplifier AR2 is applied to the inverting input of the amplifier AR3, and the brake control signal generated by the modulator 110 is applied to the noninverting input. Thus, the amplifier AR3 compares the output of the modulator 110 to the preset signal generated by the amplifier AR2. When the transmission gate TG1 is closed (reference velocity above 150 feet per second) the comparator AR3 injects current into the integrating capacitor of the modulator 110 through a diode CR1 and a resistor R8. The diode CR1 allows the amplifier AR3 to adjust the modulator output in a negative direction but not in a positive direction. The modulator 110 has its own positive forcing function and for this reason the output of the modulator 110 will stabilize at a level equal to the voltage at the output of the amplifier AR2, provided this voltage is below 3.7 volts.

With subsequent velocity errors, the output of the modulator 110 continues to decrease in a normal fashion, and the modulator preset circuit 200 does not interfere with normal modulator operation. Thus, normal modulator control continues.

The circuit of FIG. 3 has been tested in computer simulation and has been found to provide a significant reduction in initial skid activity on both wet and dry pavements. Thus, the circuit 200 offers a significant improvement in antiskid brake control in the high speed region of operation. The circuit 200 reduces stresses applied to aircraft main landing gear and contributes to a reduction in tire wear and an overall improvement in braking efficiency. With identical tuning, computer simulations of antiskid circuits having the modulator preset circuit 200 of FIG. 3 show a consistent 0.8 percent efficiency improvement on dry pavement and 0.5 percent improvement on wet pavement.

SECOND PREFERRED EMBODIMENT

Turning now to FIG. 4, a second preferred embodiment 200' of the modulator preset circuit is there shown in detail. In FIG. 4 the amplifiers AR1', AR2', AR3' correspond to the amplifiers AR1, AR2, AR3, respectively, of FIG. 3. The general operation of the embodiment of FIG. 4 is similar to that of FIG. 3 with the following exceptions.

First, the amplifier AR1' is additionally connected at its inverting input to a squat input signal which is generated by a squat switch system included in the aircraft. This squat input signal is connected to ground by the squat switch (not shown) at touch down (upon closure of the squat switch) and for three seconds thereafter. At other times the squat input signal is not connected to ground. The circuit 200' of FIG. 4 operates to close the transmission gate defined by U1' only when (1) aircraft velocity is greater than the threshold velocity (150 feet per second in this embodiment) and (2) the squat signal is present. In this way, the modulator preset function is provided only after touchdown during the delay squat interval. If desired, the squat input of FIG. 4 can be permanently terminated to ground, in which case the modulator preset circuit 200' is enabled for either landing or take off, whenever the threshold velocity is exceeded. Typically, the version shown in FIG. 4 is used on aircraft in which braking may be torque limited at higher gross weights of the departing aircraft. In such a torque limited situation, the presetting of the modulator 110 could adversely affect braking performance and therefore should be avoided.

A second difference between the circuit 200' of FIG. 4 and the circuit 200 of FIG. 3 is that the gain network of the amplifier AR2' has been modified to provide a preset signal which varies linearly between 3.7 volts at 150 feet per second and 2.7 volts at 200 feet per second. The split resistor network formed of resistors R1', R3', the clamping diode CR1', and the clamp network R2', R5' allow the preset signal to be clamped and to remain effectively constant for all aircraft velocities in excess of 200 feet per second. Thus, the embodiment of FIG. 4 ensures that, as a minimum, the output of the modulator 110 results in a standard valve driver signal of 1 milliamp (3,000 psi) at an aircraft velocity of 150 feet per second, increasing linearly to 10 milliamps (2,250 psi) at an aircraft velocity of 200 feet per second, and remaining at 10 milliamps for aircraft velocities in excess of 200 feet per second.

Figure 4A:
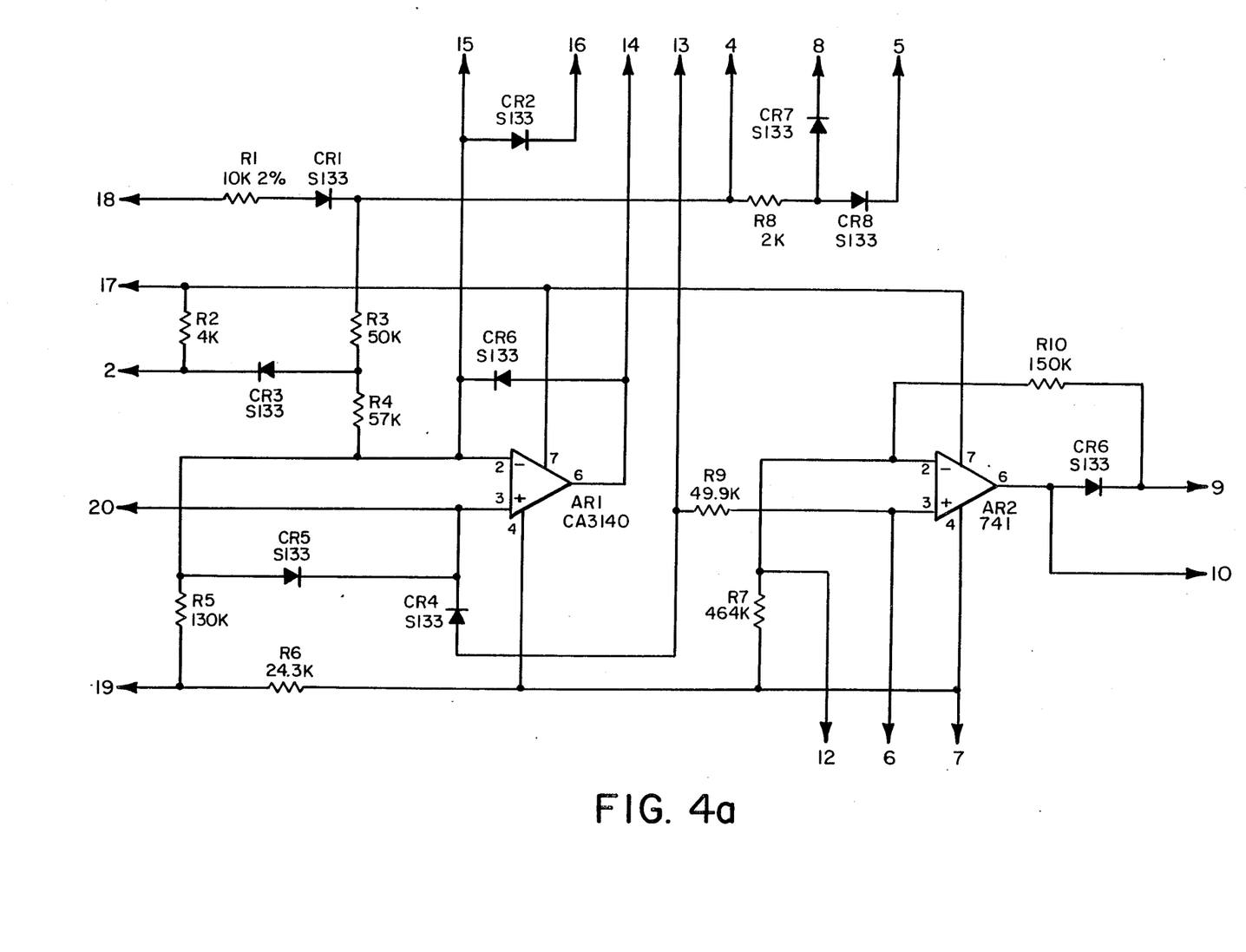
FIGS. 4a and 4b are schematic diagrams of the circuits U2' and U3' of FIG. 4, respectively.
Figure 4B:
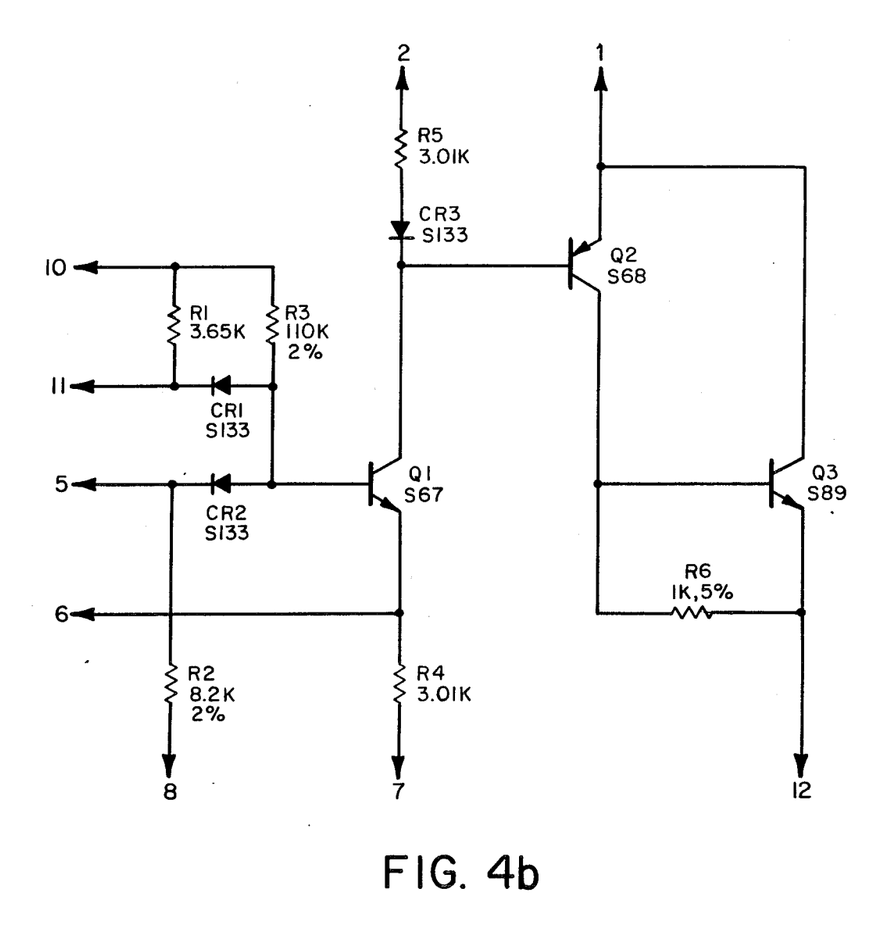

FIGS. 4a and 4b provide detailed schematic diagrams of the modulator 110 (circuit U2') and the valve driver 150 (circuit U3') used in connection with the embodiment of FIG. 4. Because the circuitry of FIGS. 4a and 4b forms no part of the present invention and has been provided merely to illustrate the environment of this embodiment, it will not be described in detail here.

In the embodiments described above, a modulator level of 3.7 volts corresponds to a valve driver current of 1 milliamp and to no reduction in metered brake pressure. Typically, the full metered brake pressure will be 3000 psi. A modulator output signal of 0 volts corresponds to a driver current of 41 milliamps and to a brake pressure of 100 psi. The modulator output and driver current are related linearly between these two limits. In FIG. 4, B+1 is a regulated voltage of 15 volts and B+2 is a regulated voltage of 4 volts. The error velocity signal in this embodiment is equal to 5 times the difference between the measured wheel velocity and the reference velocity. Thus, the error velocity is a measure of the slip velocity between the braked tire and the pavement. Similarly, the reference velocity signal is equal to 4 volts at 0 feet per second and changes linearly with reference velocity at 20 mV/foot/second.

Turning now to FIGS. 5a through 5e, these figures illustrate the operation of the embodiment of FIG. 4. Each of the graphs has as its horizontal axis the velocity of the aircraft in feet per second between 200 feet per second at the left and 50 feet per second at the right. It should be understood that all of these graphs are intended merely as typical or exemplary illustrations of one mode of operation of this embodiment.

Figure 5A:
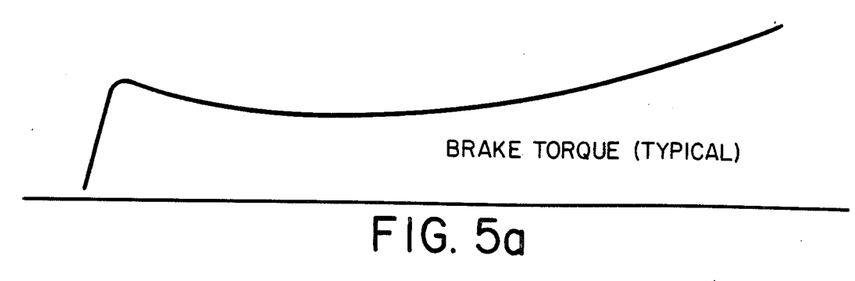
FIGS. 5a through 5e are graphs which illustrate the operation of the embodiment of FIG. 4.

FIG. 5a shows a typical brake torque curve as a function of aircraft velocity. The sharp drop in brake torque above 200 feet per second is associated with aircraft touchdown. Note that for the region of 200–150 feet per second brake torque increases with increasing aircraft velocity.

Figure 5B:
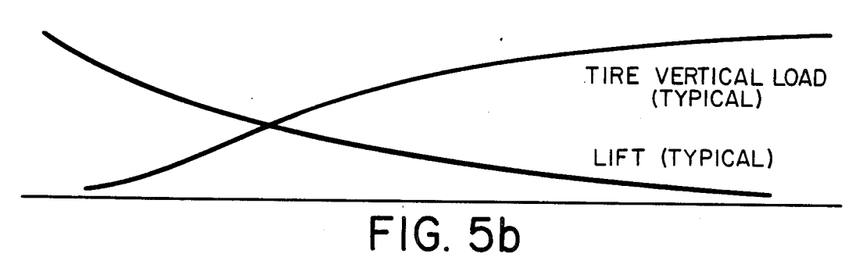
Figure 5C:
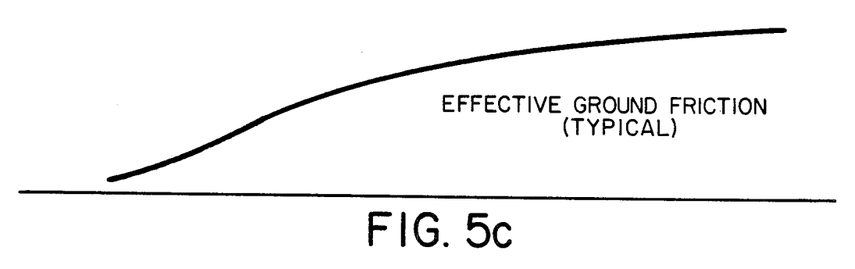

FIG. 5b shows graphs of a typical tire vertical load during a landing and the typical lift generated by an aircraft during a landing. As the aircraft speed slows, lift decreases and vertical loading on the tires increases. FIG. 5c shows the manner in which effective ground friction typically increases as aircraft velocity decreases. This increase in effective ground friction is largely a result of increasing vertical tire loading as the aircraft slows during a landing.

Figure 5D:
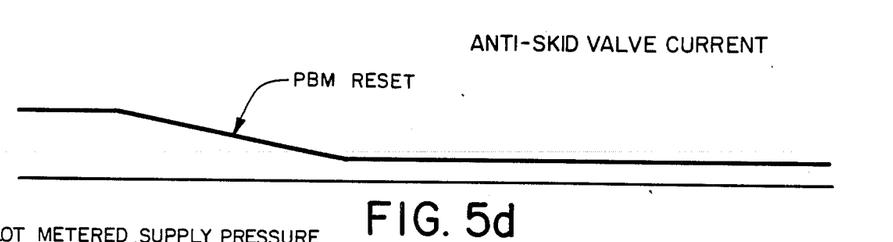

FIG. 5d shows the antiskid valve current resulting from the operation of the modulator preset circuit 200' of FIG. 4. Note that this antiskid valve current is at a constant high value for aircraft velocities greater than 200 feet per second, that it decreases linearly in the range of 200–150 feet per second, and that it remains at a constant low value at velocities less than 150 feet per second. The upper plateau at velocities greater than 200 feet per second is due to the clamping feature described above and corresponds to a maximum brake pressure of 2,250 psi, and the plateau for velocities less than 150 feet per second is due to the operation of the transmission gate U1 and corresponds to a maximum brake pressure of 3,000 psi.

Figure 5E:
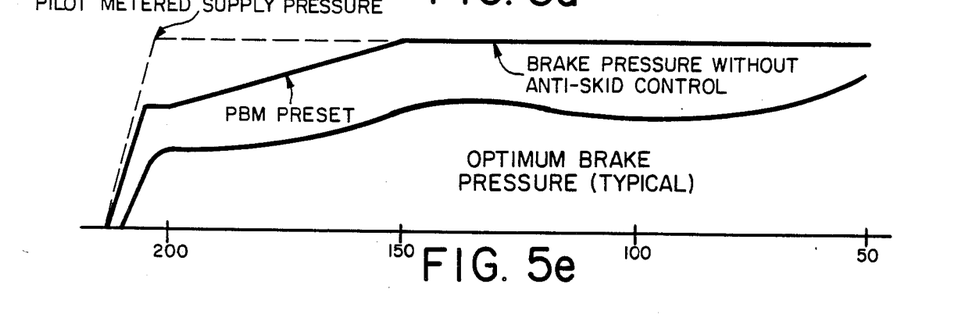

FIG. 5e shows in the lower graph the optimum brake pressure in a typical landing run as a function of aircraft velocity. Note that this optimum brake pressure increases in the range of 200–150 feet per second as aircraft velocity decreases. FIG. 5e also shows the manner in which the modulator preset circuit 200' of FIG. 4 automatically reduces the pilot-metered supply pressure to an extent which varies directly with aircraft velocity in excess of 150 feet per second. Thus, in the range of velocities between 200 and 150 feet per second, the greater the velocity the greater the reduction in pilot-metered supply pressure. The upper solid curve of FIG. 5e then shows the maximum brake pressure that can be applied to the brake 20 during the landing run, in the absence of antiskid control. Of course, the operation of the antiskid control system 60 will reduce this maximum available brake pressure as necessary to control skid activity. It is important to recognize that the operation of the modulator preset circuit 200' makes the initial maximum available brake pressure more closely equal to the optimum brake pressure for a typical dry runway in order to reduce initial skid activity and thereby increase braking efficiency and reduce tire wear.

An important feature of this invention is that it presets the modulator 110 at the start of a braking period, prior to any skid activity. Because it takes some time to preset the modulator 110, this means that the time needed to preset the modulator 110 does not result in excessive skid activity in most cases. As used herein, the term "braking period" is meant to refer to a period such as an aircraft landing during which braking may be required after a period of no braking.

It should be understood, that it is not essential that all embodiments of the present invention use a velocity threshold to enable the modulator preset circuit. In the foregoing embodiments, such a velocity threshold has been set approximately equal to the typical landing speed of the aircraft in question, as an indication of the potential need for a maximum efficiency stop. This approach has the advantage that it ensures that the preset circuit will not interfere with normal braking at speeds below the threshold velocity. However, in alternate embodiments, the transmission gate TG1,U1 can be entirely eliminated and the modulator preset circuit can always be enabled. This approach is well-suited for use in aircraft in which the brakes are never torque limited. However, in situations where the brakes may be torque limited, as for example on take-off of a heavily loaded aircraft, a timer such as that described above in conjunction with the squat input can be used to ensure that the modulator preset circuit does not interfere with normal braking operation during a rejected takeoff. This timer approach can be used either in conjunction with the threshold velocity as described above, or without a threshold velocity enabling system. Of course, whatever the approach, the preset circuit should be carefully adjusted to the individual aircraft to ensure that it does not reduce braking effort excessively so as to reduce braking efficiency.

Of course, it should be understood that a wide range of changes and modifications can be made to the preferred embodiments described above. It is therefore intended that the foregoing detailed description be regarded as illustrative rather than limiting, and that it be understood that it is the following claims, including all equivalents, which are intended to define the scope of this invention.

I claim:

1. In a vehicle antiskid brake control system for controlling the braking action on a braked wheel; said system comprising modulator means for generating a modulated antiskid brake control signal as a time integral function of a signal indicative of a braking condition of the braked wheel, wherein the magnitude of the antiskid brake control signal is indicative of a desired level of progressive reduction of the maximum available braking action to reduce skidding of the braked wheel; and valve means, responsive to the antiskid brake control signal, for limiting braking of the braked wheel by an amount which varies progressively in accordance with the magnitude of the antiskid brake control signal; the improvement comprising:

means for presetting the modulator means to preset the magnitude of the antiskid brake control signal to a preset value indicative of a desired partial reduction of the maximum available braking action; and means, included in the presetting means, for enabling the presetting means at the start of a braking period, regardless of skid activity of the braked wheel.

2. The invention of claim 1 wherein the brake control system further comprises means for generating a velocity signal indicative of velocity of one of the vehicle and the braked wheel, and wherein said preset value varies progressively in magnitude in accordance with the velocity signal such that the brake control signal is indicative of a corresponding partial reduction in the maximum available braking action, which partial reduction varies progressively in accordance with the velocity signal.

3. The invention of claim 2 wherein the preset value varies in accordance with the velocity signal such that a higher velocity of said one of the vehicle and braked wheel is associated with a more severe limitation of braking of the braked wheel.

4. The invention of claim 3 further comprising means for clamping the preset value at amplitudes of the velocity signal beyond a predetermined amplitude.

5. The invention of claim 1, wherein the brake control system further comprises means for generating a velocity signal indicative of velocity of one of the vehicle and braked wheel, and wherein the enabling means comprises means for enabling the presetting means when the velocity signal exceeds a selected threshold.

6. The invention of claim 5 wherein the enabling means further comprises means for disabling the presetting means except for a selected period following the start of the braking period.

7. The invention of claim 5 wherein said velocity signal is indicative of the velocity of the vehicle.

8. The invention of claim 1 wherein the vehicle is an aircraft.

9. The invention of claim 8 wherein the braking period occurs during a landing, and wherein the enabling means enables the presetting means on at least some occasions prior to an initial application of braking forces to the braked wheel.

10. In a vehicle antiskid brake control system for controlling the braking action on a braked wheel; said system comprising modulator means for generating a modulated antiskid brake control signal as a time integral function of a signal indicative of a braking condition of a braked wheel, wherein the magnitude of the antiskid brake control signal is indicative of a desired level of progressive reduction of the maximum available braking action to reduce skidding of the braked wheel; valve means, responsive to the brake control signal, for limiting braking of the braked wheel by an amount which varies progressively in accordance with the magnitude of the antiskid brake control signal; and means for generating a velocity signal indicative of velocity of one of the vehicle and braked wheel; the improvement comprising:

means, responsive to the velocity signal, for presetting the modulator means to preset the magnitude of the antiskid brake control signal to a preset value to ensure that the brake control signal corresponds to at least a selected partial reduction of braking action, which selected partial reduction varies in magnitude as a function of the velocity signal; and means for enabling the presetting means at least at the start of a braking period.

11. The invention of claim 10 wherein the vehicle is an aircraft, wherein the braking period corresponds to a landing, and wherein the selected partial reduction of braking action increases with higher velocities of said one of the vehicle and the braked wheel, for at least a selected range of velocities.

12. The invention of claim 11 wherein the enabling system further comprises means for disabling the presetting means at velocities of the vehicle less than a threshold velocity.

13. The invention of claim 12 wherein the brake control system further comprises a squat switch system which generates a squat signal for a selected time after aircraft touchdown, and wherein the enabling means comprises means for disabling the presetting means when the squat signal is absent.

14. The invention of claim 11 wherein the presetting means further comprises means for clamping the selected partial reduction of braking action to a clamp value for velocities of the aircraft greater than a clamp velocity.

15. In an aircraft antiskid brake control system for controlling the braking action on a braked wheel of an aircraft; said system comprising modulator means for generating a modulated brake control signal, said modulator means comprising an integrating capacitor; valve means, responsive to the brake control signal, for limiting braking of the braked wheel; and means for generating a velocity signal indicative of velocity of the aircraft; the improvement comprising:

a preset circuit having a first input coupled to receive the velocity signal, a second input coupled to receive the braking control signal, and an output coupled to modify the charge on the capacitor, said preset circuit comprising means for modifying the charge on the capacitor in response to the velocity signal to ensure that the brake control signal corresponds to at least a selected limitation of braking action which varies as a function of the velocity signal such that the degree of limitation of braking action increases with higher aircraft velocities for a selected range of aircraft velocities;

a gate interposed between the output and the capacitor; and a comparator having a first input coupled to the velocity signal, a second input coupled to a reference indicative of a preset threshold velocity, and an output coupled to control the gate such that the gate is closed and the preset circuit is activated only when the aircraft velocity is greater than the preset threshold velocity.

16. The invention of claim 15 wherein the preset threshold velocity is about 150 feet per second.

17. The invention of claim 15 wherein the brake control system further comprises a squat switch system which generates a squat signal for a selected time after aircraft touchdown, and wherein the invention further comprises means for opening the gate when the squat signal is absent.

18. The invention of claim 15 wherein the preset circuit further comprises means for clamping the selected limitation of braking action to a constant value for values of the velocity signal indicative of aircraft velocities above a selected value.

* * * * *